US011948178B2

(12) United States Patent
Colombier et al.

(10) Patent No.: US 11,948,178 B2
(45) Date of Patent: Apr. 2, 2024

(54) ANOMALY DETECTION AND SUBSEGMENT ANALYSIS METHOD, SYSTEM, AND MANUFACTURE

(71) Applicant: Content Square SAS, Paris (FR)

(72) Inventors: Michael Colombier, Paris (FR); Julien Nehring, Paris (FR); Romain des Fontaines, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/876,846

(22) Filed: Jul. 29, 2022

(65) Prior Publication Data
US 2024/0037625 A1    Feb. 1, 2024

(51) Int. Cl.
G06Q 30/00     (2023.01)
G06F 16/955    (2019.01)
G06Q 30/0601   (2023.01)

(52) U.S. Cl.
CPC ..... G06Q 30/0625 (2013.01); G06F 16/9554 (2019.01); G06F 16/9566 (2019.01)

(58) Field of Classification Search
CPC ...... G06Q 30/0601–0645; G06Q 30/08; G06F 16/9566; G06F 16/9554
USPC ............................................. 705/26.1–27.2
See application file for complete search history.

(56) References Cited

U.S. PATENT DOCUMENTS

| | | | |
|---|---|---|---|
| 7,805,337 B1* | 9/2010 | Ogg | G06Q 30/0601 705/26.1 |
| 9,330,258 B1* | 5/2016 | Satish | H04L 63/1441 |
| 10,360,589 B1* | 7/2019 | Channappa | G06Q 30/0251 |
| 10,423,691 B1* | 9/2019 | Patel | G06F 16/9566 |
| 2002/0007322 A1* | 1/2002 | Stromberg | G06Q 30/06 705/26.1 |
| 2009/0164502 A1* | 6/2009 | Dasgupta | G06F 16/9566 707/999.102 |
| 2013/0085894 A1* | 4/2013 | Chan | G06Q 30/02 705/26.62 |

(Continued)

OTHER PUBLICATIONS

Anonymous; "MySQL REGEXP: Search Based on Regular Expressions"; Jul. 10, 2019; MYSQL Tips (https://web.archive.org/web/20190710193522/https://www.mysqltutorial.org/mysql-regular-expression-regexp.aspx) (Year: 2019).*

(Continued)

Primary Examiner — Jeffrey A. Smith
Assistant Examiner — Lindsey B Smith
(74) Attorney, Agent, or Firm — Schwegman Lundberg & Woessner, P.A.

(57) ABSTRACT

Systems and techniques may be used for identifying a product from a uniform resource locator (URL) of a website. A technique may include receiving the URL based on a user interaction with the website, the user interaction triggering an event on the website. In an example, the technique includes comparing the URL to a database of stored URLs. The technique may include determining a portion of the URL, comparing, for example using a regular expression, the portion of the URL to entries in a specified product name column of the database, and identifying a product in the specified product name column corresponding to the portion of the URL based on comparing the portion of the URL. The technique may include outputting an indication of the product.

24 Claims, 9 Drawing Sheets

(56) References Cited

U.S. PATENT DOCUMENTS

| | | | | |
|---|---|---|---|---|
| 2013/0346622 A1* | 12/2013 | Wu | ............... | G06F 17/10 |
| | | | | 709/227 |
| 2014/0095354 A1* | 4/2014 | Hegarty | ............. | G06Q 30/0613 |
| | | | | 705/26.41 |
| 2014/0317482 A1* | 10/2014 | Sun | ............... | G06F 16/9577 |
| | | | | 715/205 |
| 2020/0233919 A1* | 7/2020 | Howe | ............... | G06F 16/9014 |
| 2022/0043962 A1* | 2/2022 | Fukui | ............... | G06F 40/134 |

OTHER PUBLICATIONS

Pietroluongo, Nicola, Demystifying Regex with Practical Examples, Sep. 23, 2015, Sitepoint.com, accessed at [https://www.sitepoint.com/demystifying-regex-with-practical-examples/] (Year: 2015).*

* cited by examiner

ANOMALY DETECTION AND SUBSEGMENT ANALYSIS METHOD, SYSTEM, AND MANUFACTURE

BACKGROUND

Web commerce has become a nearly universal way to sell products. Managing web commerce websites is often done by a team of people, who use web analytics to make design, structural, and interactive choices for the web commerce websites. Sales data from a website may be used to determine whether a product is successful. However, the sales data does not tell the entire story, nor does it provide sufficient data to make proactive decisions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Systems and techniques described herein may be used for identifying a product from a uniform resource locator (URL) of a website. In some examples, the URL may be compared to a set of URLs or other information (e.g., a product identifier) in a database to determine product information. In other examples, a portion of the URL may be used (e.g., a string in the URL). The portion of the URL may be compared to information in a database, such as information in a particular column. A regular expression may be used to obtain the portion of the URL or to search the database (e.g., to search the column) for the portion of the URL.

The systems and techniques described herein provide a technical solution to determining information related to a product. An example technological problem solved by these systems and techniques includes how to determine when a product is loaded or displayed on a website, when the product is purchased or added to a cart to purchase, when a product page is viewed, conversion rate of the product, attractiveness of the product, or the like. These determinations may include pageviews in the thousands or millions, making any manual process infeasible. A manual process would further be prone to errors, and essentially impossible to perform in any useful time frame. The technical solutions described herein may be used to provide insights or metrics related to a product quickly and accurately using objective search criteria (e.g., via a regular expression).

Networked Computing Environment

Figure 1:
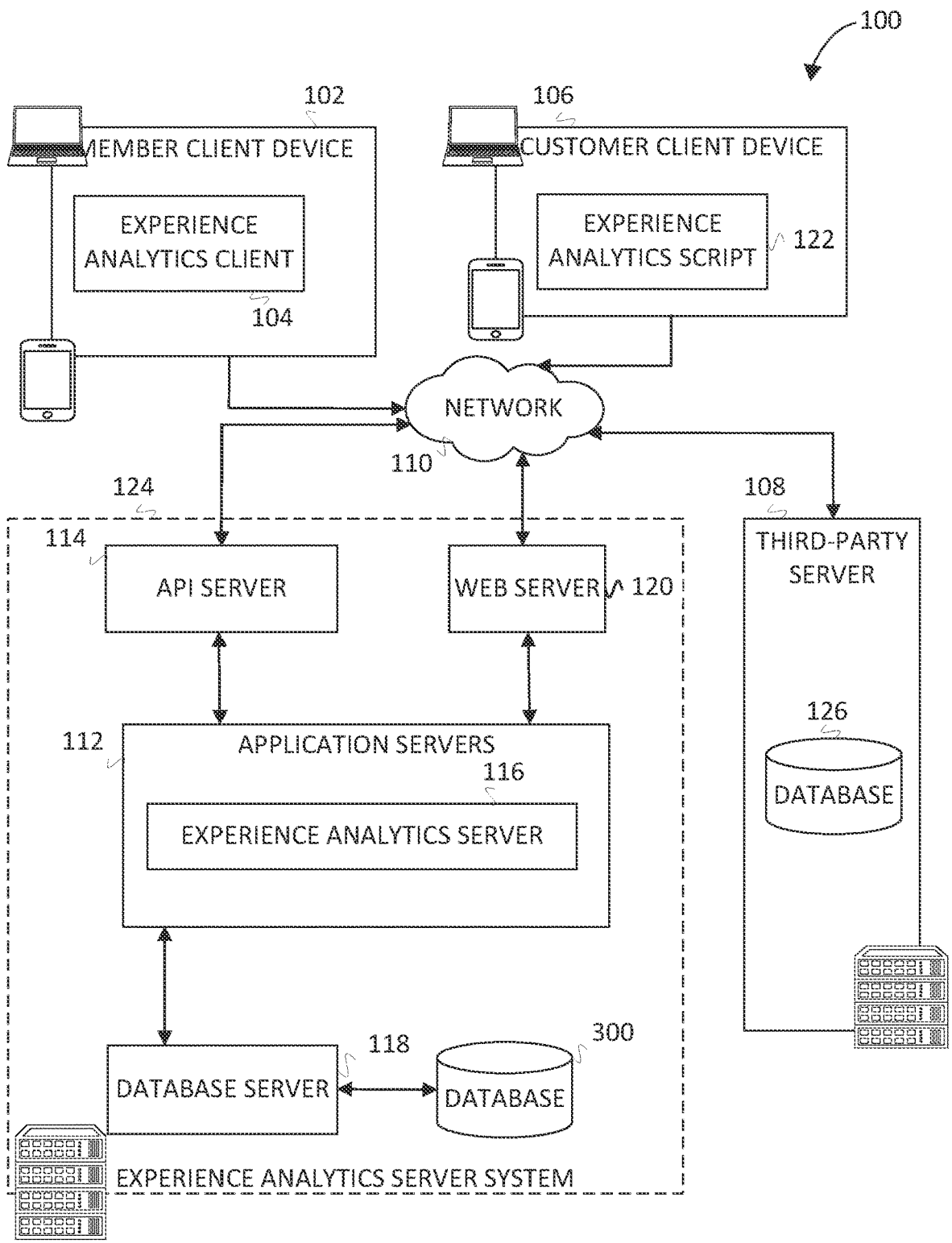
FIG. 1 is a diagrammatic representation of a networked environment in which the present disclosure may be deployed in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

In some examples, the third-party server 108 may include a database 126 (or be communicatively coupled to the database 126). The database 126 may store data related to products, for example for sale at the website. The database 126 may include multiple columns with data related to the products. Example columns may include a sale price column, a product identifier column (e.g., a list of numbers corresponding to products), a product name column, a URL column (e.g., for a website where the product is available for purchase), a product description column, or the like. The database 126 may be accessed by the experience analytics server system 124 or the member client device 102 (e.g., via the experience analytics client 104) to provide data (e.g., from the product identifier column) for the product. The experience analytics server system 124 or the member client device 102 may query the database 126 (e.g., using a regular expression) using a URL or a portion of a URL to determine whether product data is in the database 126. When a match to the URL or the portion of the is in the database 126, the third-party server 108 may send data related to the product (e.g., a product name, a product description, a sale price, etc.) to the experience analytics server system 124 or the member client device 102.

System Architecture

Figure 2:
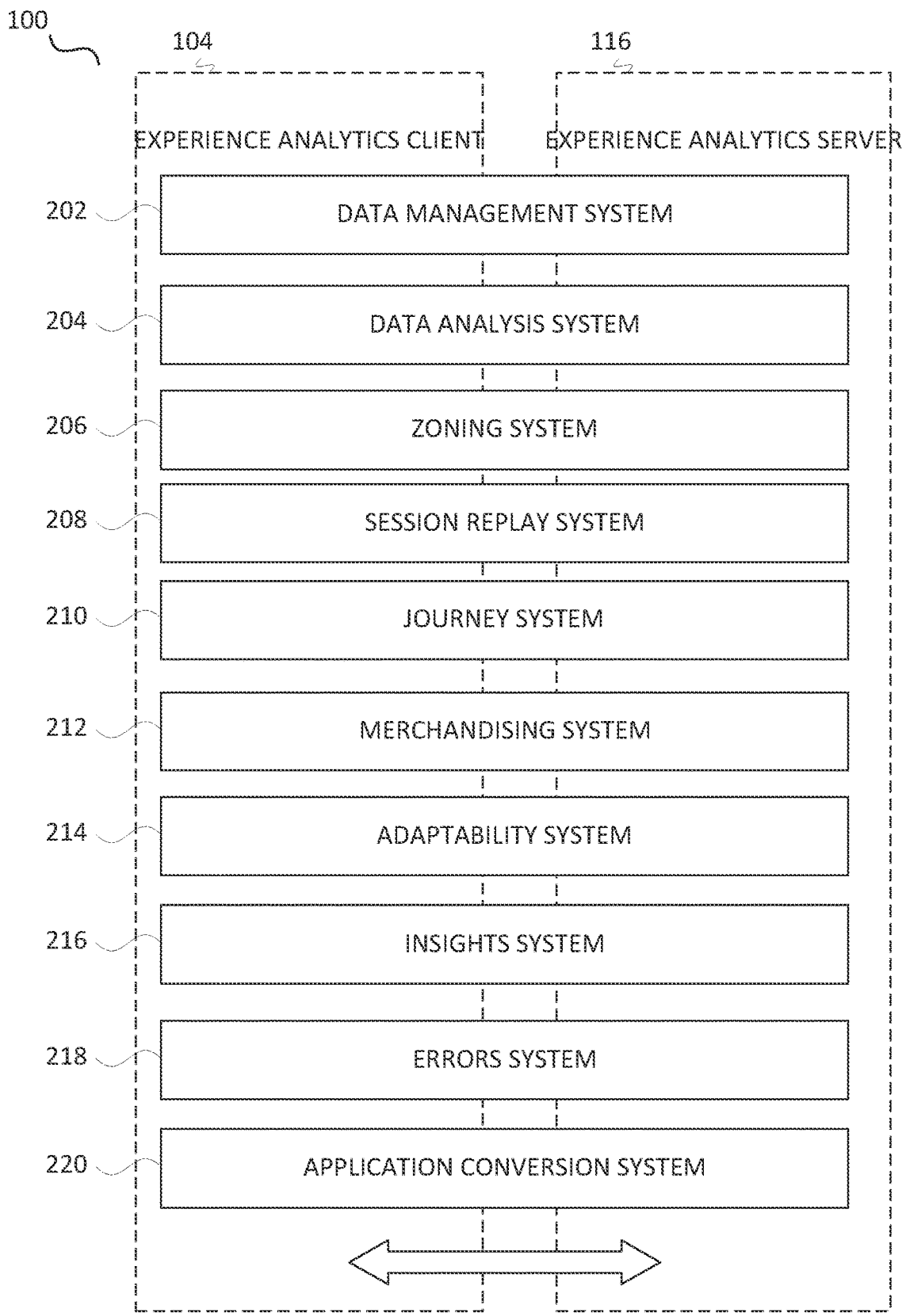
FIG. 2 is a diagrammatic representation of an experience analytics system that has both client-side and server-side functionality in accordance with some examples.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives at the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey on the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The data management system 202 may store pageviews or unit prices corresponding to out of stock items. The data analysis system 204 may use the stored pageviews or unit prices, for example along with an average conversion rate, to determine a loss indicator for the out of stock item. The average conversion rate may be stored at the data management system 202. The loss indicator may be output from the experience analytics server 116, for example to a user device for display.

Data Architecture

Figure 3:
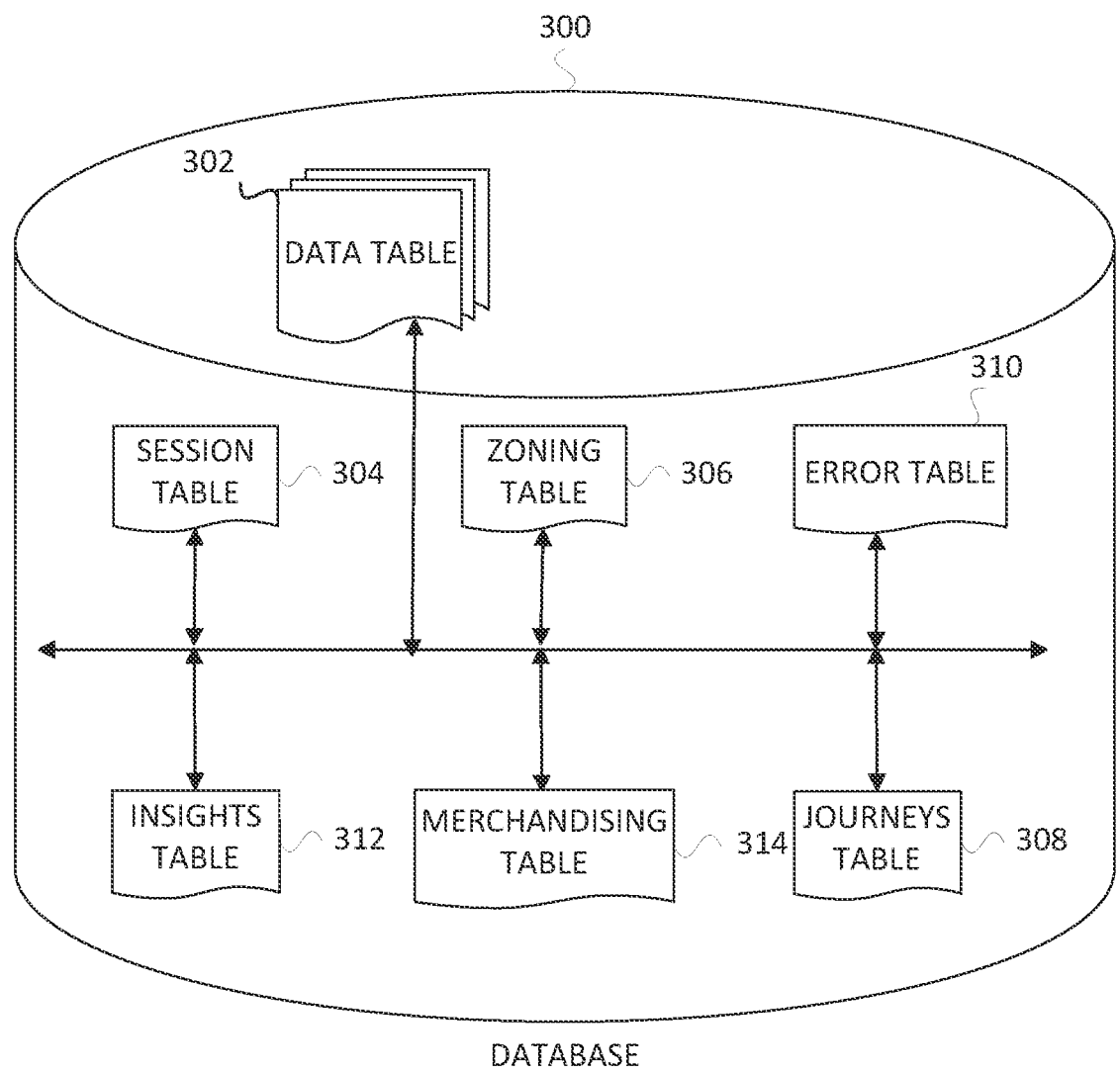
FIG. 3 is a diagrammatic representation of a data structure as maintained in a database in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
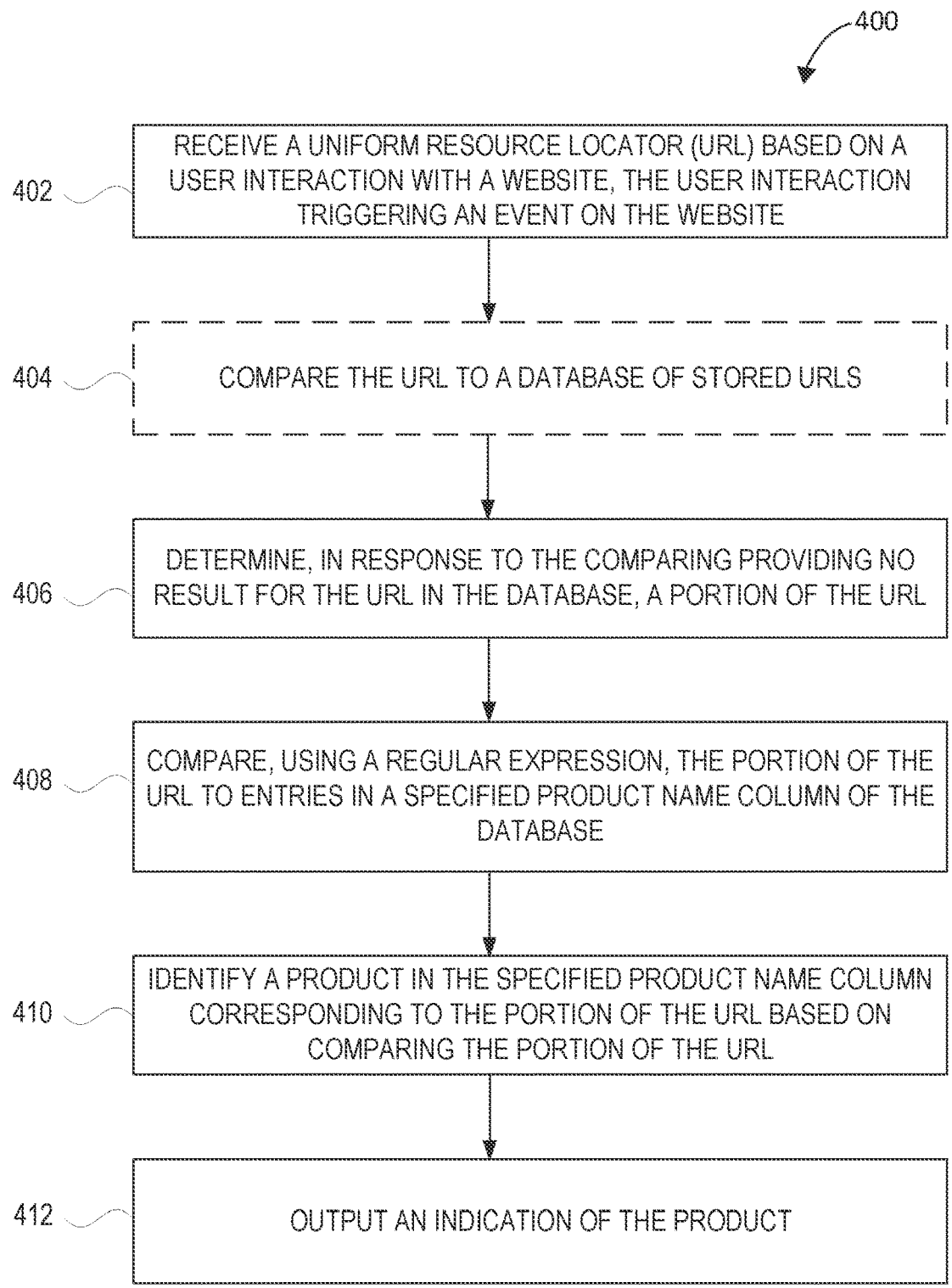
FIG. 4 is a flowchart for a process in accordance with some examples.

FIG. 4 is a schematic diagram illustrating a process 400 for identifying a product from a uniform resource locator (URL) of a website.

The process 400 includes an operation 402 to receive a uniform resource locator (URL) based on a user interaction with a website, the user interaction triggering an event on the website. The user interaction may include a user selecting an indication, such as to purchase the product on the website (e.g., selecting a "buy now" icon, an "add to cart" icon, a click on an element, a page view, etc.). In some examples, the user interaction may not necessarily be related to a product (e.g., a page view).

The process 400 includes an optional operation 404 to compare the URL to a URL or other column of a database. This optional operation may be used as a first attempt (e.g., comparing the URL to a URL column), and a second attempt may be performed in operations 406-408 below, such as a fallback field.

The process 400 includes an operation 406 to determine a portion of the URL. In an example where optional operation 404 was performed, operation 406 may occur in response to the comparing providing no result for the URL in the database. When operation 404 is omitted, the determination in operation 406 may be performed without being in response to a comparison providing no result. The portion of the URL may correspond to a product identifier, such as a stock keeping unit (SKU), a universal product code (UPC), etc.

The process 400 includes an operation 408 to compare, using a regular expression, the portion of the URL to entries in a specified product name column of the database. The entries in the specified product name column may include stock keeping units (SKUs) corresponding to products (e.g., products sold on the website).

The process 400 includes an operation 410 to identify a product in the specified product name column corresponding to the portion of the URL based on comparing the portion of the URL. In some examples, the specified product name column includes multiple product variants corresponding to the portion of the URL. In these examples, the product identified may be a first product of the multiple product variants that is identified when comparing the portion of the URL (e.g., a product highest listed in the column, a first variant identified, etc.). The portion of the URL or the specified product name column may be determined or specified based on the website. For example, a merchant owning or operating the website may specify a column in a database that includes product identifiers (e.g., a column labeled "products") or a portion of a URL that includes a product identifier after the third "/" in the URL, a string corresponds to a product identifier, or the like).

The process 400 includes an operation 412 to output an indication of the product. In an example, the indication of the product may be displayed (e.g., on a user interface). The process 400 may include providing an insight related to the user interaction for the product at the website. The insight may be displayed on a user interface. The insight may include a conversion rate or attractiveness of the product, for example.

Machine Architecture

Figure 5:
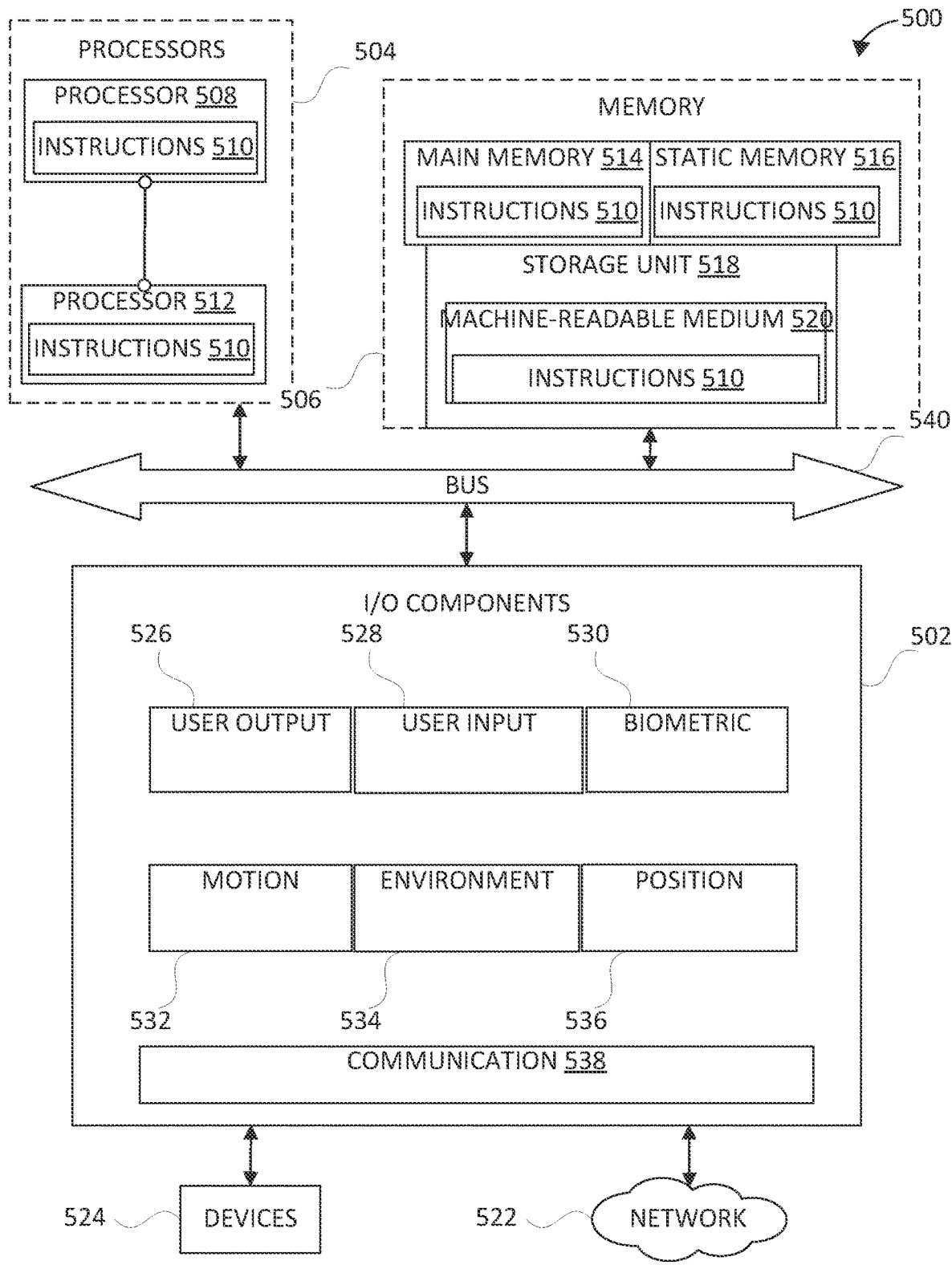
FIG. 5 is a diagrammatic representation of a machine in the form of a computer system within which a set of instructions may be executed for causing the machine to perform any one or more of the methodologies discussed herein in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NEC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
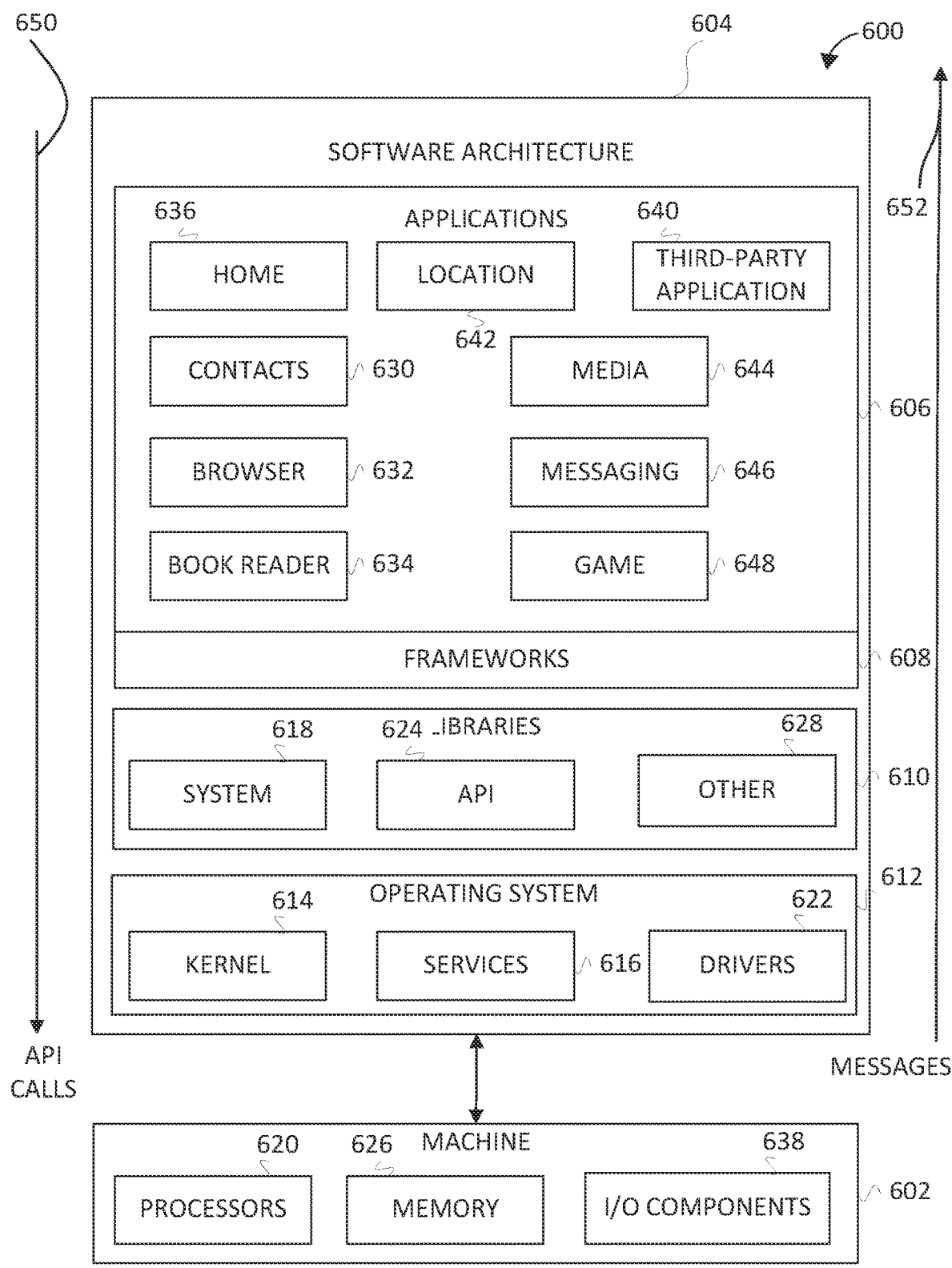
FIG. 6 is a block diagram showing a software architecture, within which examples may be implemented in accordance with some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Block Diagram

Figure 7:
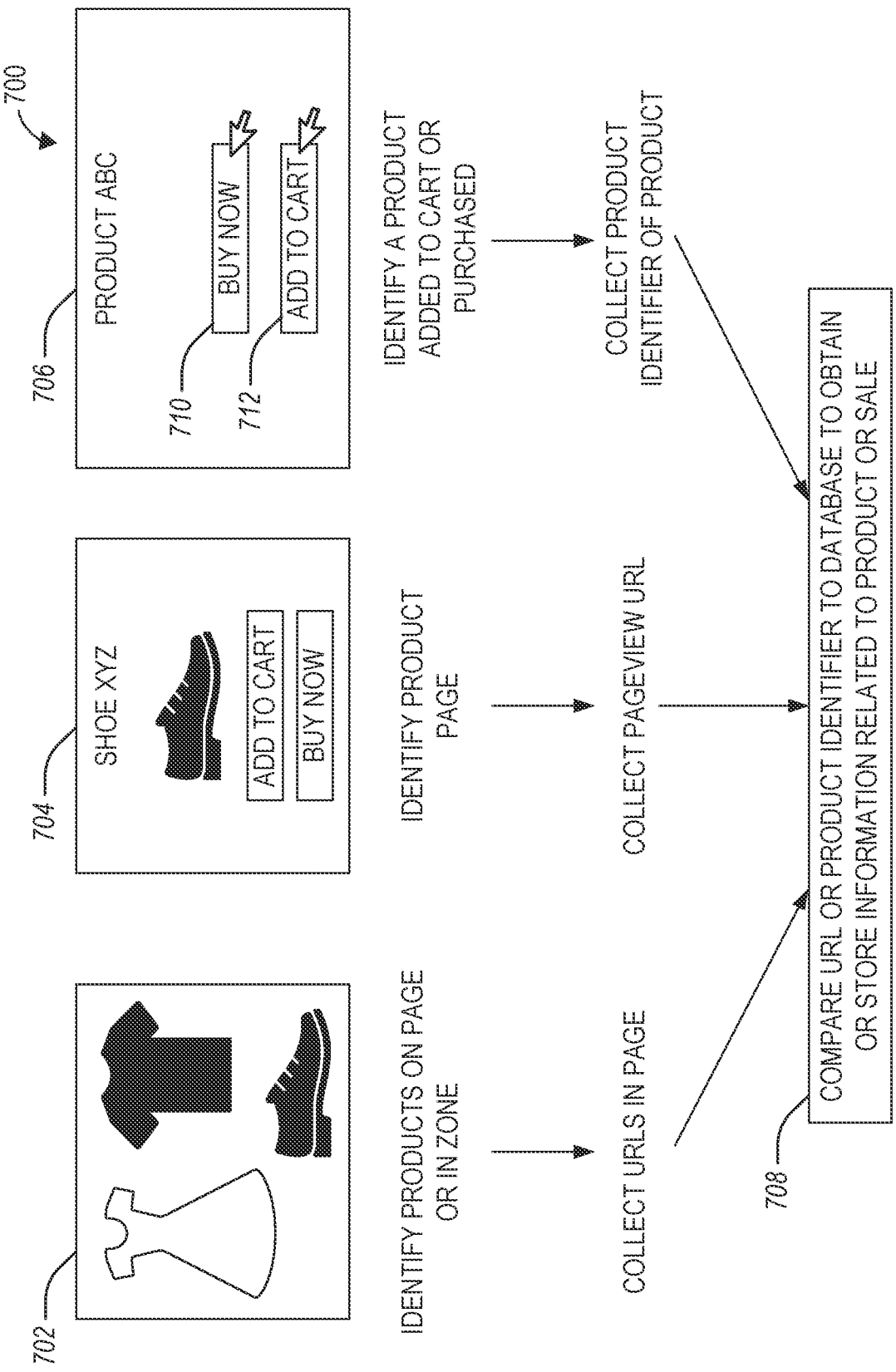
FIG. 7 is a block diagram showing a product tracking process in accordance with some examples.

FIG. 7 is a block diagram 700 showing a product tracking process in accordance with some examples. The block diagram 700 illustrates different actions that may be taken by users on various websites related to a product. For example, at block 702, a page may be viewed with multiple products. The product tracking process may include identifying products on the page or in a zone of the page shown in block 702.

In this example, URLs that are on the page (e.g., links displayed or hidden on the page) may be collected. These URLs may be used at block 708 to identify one or more products from the page shown in block 702. Block 708 is described in more detail below.

At block 704, a product page is shown. The product page may include a single product, a set of related products (e.g., variants, such as products that only vary by color, size, etc.), or the like. For the product page of block 704, the URL of the product page itself may be collected. The URL of the product page itself may include the URL used to access the product page by the user, a redirect URL (e.g., an initial, intermediate, or final URL used to access the product page), or the like. The collected URL of the product page itself may be used at block 708 to identify a product displayed or for sale on the product page. In examples where variants are shown or available for purchase on the product page, one or more variants may be determined at block 708.

At block 706, after selection of the buy now indication 710 or the add to cart indication 712, a product may be purchased or added to a cart to purchase. To identify the product purchased or to be purchased, a product identifier of the product may be collected. The product identifier may be available based on the selection of one of the indications 710 or 712. For example, an event may trigger based on the selection, sending a SKU or product identifier to block 708.

At block 708, a URL or a product identifier may be compared to a database to obtain or store information related to a product or sale. Considering specific examples, at block 708 the product tracking process may include comparing one or more of the URLs from block 702 to a particular column of the database to determine which products were displayed, loaded, or viewed at the page of block 702. For example, the URLs collected from the page of block 702 may include one or more URLs corresponding to a product page (e.g., the product page of block 704) and one or more URLs corresponding to non-product pages (e.g., other links, such as to social media, other websites, etc.). Those URLs that correspond to a product page may have corresponding URLs or identifiers in the database. A URL may be compared to entries in a column of the database to determine whether it corresponds to a product or not, and when there is a correspondence, what product corresponds to the URL. In some examples, after determining a set of URLs of the URLs on the page of block 702 that correspond to products, a page view for each of the determined products may be counted and stored.

When the URL is a pageview URL of a product page (e.g., at block 704), the product tracking process may include comparing the URL or a portion of the URL to the database at block 708. In some examples, the URL may be stored in the database, and in these examples a direct URL to URL comparison match may be made. In other examples, a portion of the URL may be stored in an entry, for example in a particular column, which may be specified (e.g., by an owner or operator of the page or website). The portion of the URL may include a string, such as a product identifier (e.g., letters, numbers, etc.), a subset of the URL (e.g., omitting "https" or "www" or the like), etc. The product page URL may be processed (e.g., using a regular expression) to obtain a portion of the product page URL to be searched in the database. The search of the database (e.g., of the particular column) may include attempting to match the processed portion of the product page URL to one or more entries in the database. In some examples, the search of the database includes using a regular expression to process one or more entries in the database, and comparing the processed one or more entries to the processed portion of the product page URL (or directly to a URL or a portion of the URL). Once identified, a page view for the product corresponding to the product page of block 704 may be counted and stored.

At block 708, the product identifier collected at block 706 may be compared to the database (e.g., comparing to a particular column of the database). The comparison may use the product identifier without modification to compare to product identifier examples in the database. In other examples, the product identifier from block 706 or information stored in the database may be searched in a modified manner (e.g., using a regular expression) to determine a match for the product identifier from block 706. Once identified, a conversion, click through, purchase, etc. may be may be counted and stored for the product of block 706 corresponding to the product identifier.

User Interfaces

Figure 8:
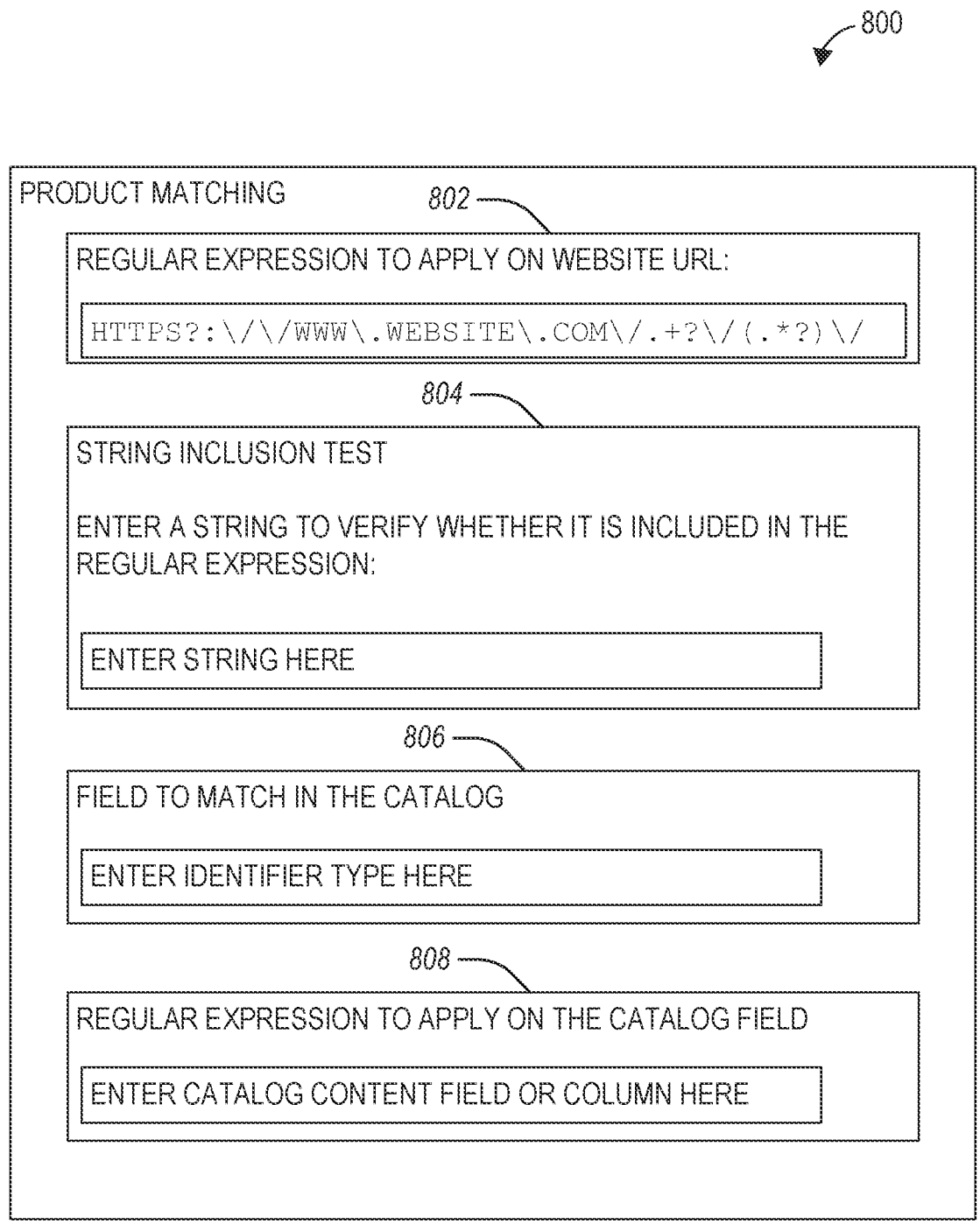
FIGS. 8-9 are example user interfaces showing product matching in accordance with some examples.
Figure 9:
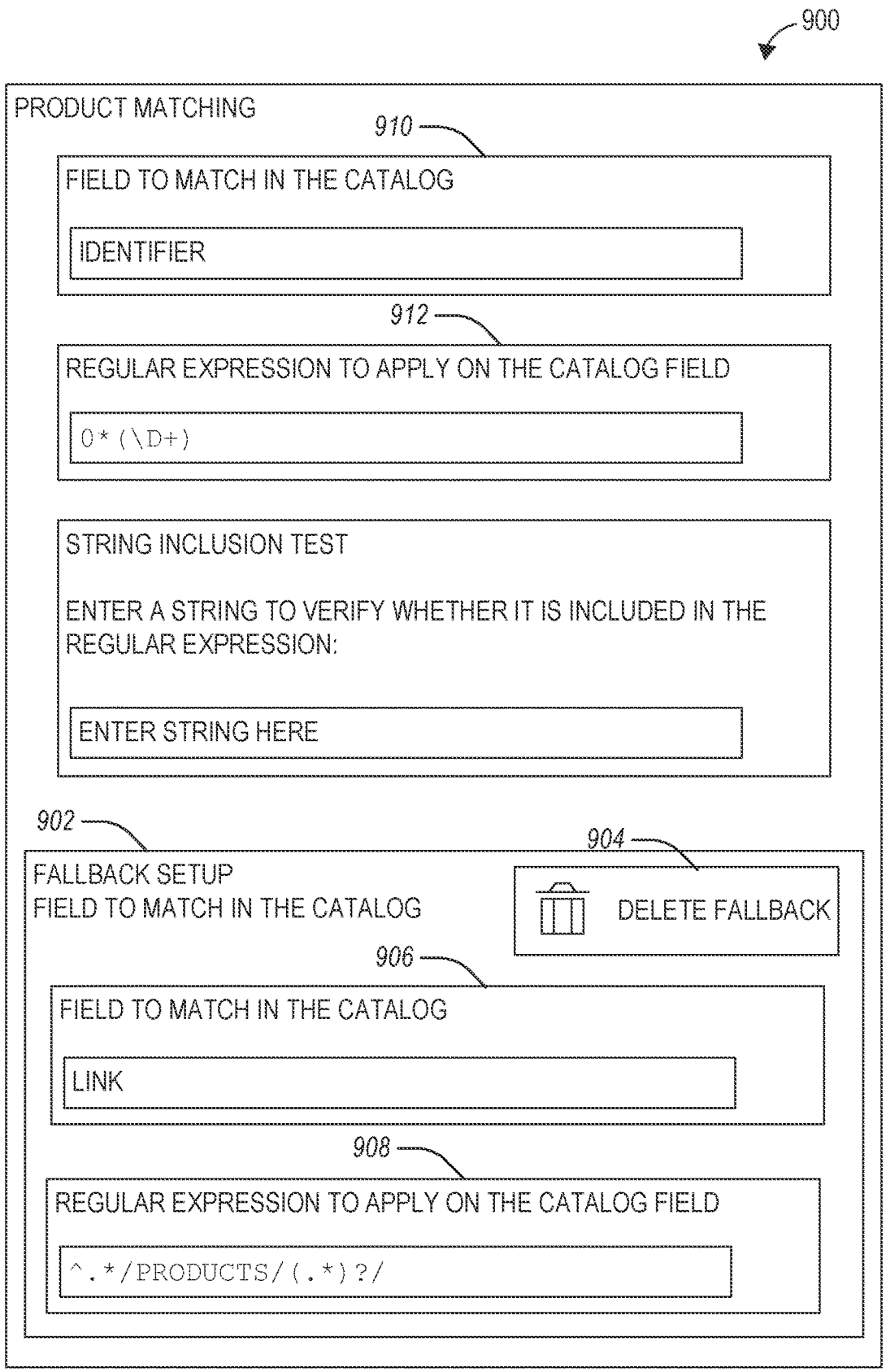

FIGS. 8-9 are example user interfaces showing product matching in accordance with some examples. FIG. 8 shows a first product matching user interface 800 for searching a database. FIG. 9 shows a second product matching user interface 900 (which in some examples may be the same as user interface 800, such as after scrolling, a selection is made, a parameter is set, or the like) for searching a database.

The user interface 800 provides options for how to match a URL or portion of a URL to a column in a database. For example, box 802 includes an option to apply a regular expression on a URL. For example, a URL or set of URLs may be obtained from a website (e.g., as described herein, such as with respect to FIG. 7). The regular expression in box 802 may be applied to the URL or set of URLs to extract a string (e.g., corresponding to a product identifier, a product name, etc.). The string may be used to search the database (e.g., for entries in a specified column). The user interface 800 includes a string inclusion test box 804 where a string may be checked to verify that it is included in a regular expression entered in box 802. Box 804 provides a verification to ensure that the regular expression has been correctly entered in box 802.

In some examples, the user interface 800 includes a field match box 806, which provides an opportunity for a user to enter a field to search in a database. A field may include a column, a set of entries (e.g., one or more rows or columns, a subset of a row or column, etc.). The field identifier entered in box 806 may include a title, metadata, or identifier of a row, column, or set of entries in the database. The title, metadata, or identifier may be part of the database (e.g., a first entry in a column) or provided separately (e.g., an indicator in metadata may point to or otherwise indicate a set of entries). The user interface 800 includes a field search box 808, which allows a user to enter a regular expression (or other search) to apply on the catalog field. The search box 808 may include an entry field for entry of a regular expression, which be similar to the one entered in box 802, in some examples.

In the example shown in user interface 800, any one or more (or none) of the boxes 802-808 may be used. For example, a search of a database may include submitting a URL and receiving matches to the URL in its entirety, using none of the boxes 802-808. In another example, a user may enter a regular expression to apply on the website URL in box 802. In yet another example, a user may enter a regular expression to apply on the catalog field (e.g., database column) in box 808. In still another example, a user may enter a regular expression in both boxes 802 and 808. In response to a search, the user interface 800 may present a result, such as no match identified, an identified matching string, a product identifier, a product name, or the like.

The user interface 900 includes a fallback setup box 902. The fallback setup box 902 provides a backup opportunity to match an input to a column in the database. The fallback setup 902 includes an option for a backup field or regular expression 912 apply when searching a database. A primary field box 910 or primary regular expression box 914 may be used to provide a first field or first regular expression to use when searching the database. In examples where the first field or regular expression fails to find a match for a collected URL or portion of a collected URL, the fallback setup box 902 may be used. The fallback setup box 902 may include a secondary field box 906 or a secondary regular expression box 908. In some examples, the secondary field box 906 may be used to provide a second field to search after searching the primary field from box 910. In some examples, the secondary regular expression box 908 may be used to provide a second regular expression to use on entries in the database after searching using the primary regular expression of box 912. The fallback setup box 902 includes a selectable indication 904 to delete a fallback entry (e.g., delete an entry in box 906 or box 908, or both).

Either of the second field or the second regular expression may be used. In some examples, the second field may replace the first field, but use the first regular expression, or the second regular expression may replace the first regular expression but use the first field. In some examples, the second field and the second regular expression may replace the first field and first regular expression. In some examples, the second field and second regular expression may be used separately and together. For example, a series of searches may be used, such as first field using first regular expression, first field using second regular expression, second field using first regular expression, or second field using second regular expression. More than one fallback field or regular expression may be used (e.g., the fallback setup box 902 may include multiple backup field boxes or multiple backup regular expression boxes).

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Example 1 is a method comprising: receiving a uniform resource locator (URL) based on a user interaction with a website, the user interaction triggering an event on the website; determining, using a processor, a portion of the URL; comparing, using a regular expression, the portion of the URL to entries in a specified product name column of the database; identifying a product in the specified product name column corresponding to the portion of the URL based on comparing the portion of the URL; and outputting an indication of the product.

In Example 2, the subject matter of Example 1 includes, wherein the user interaction includes a user selecting an indication to purchase the product on the website.

In Example 3, the subject matter of Examples 1-2 includes, wherein the portion of the URL corresponds to a product identifier.

In Example 4, the subject matter of Examples 1-3 includes, wherein the specified product name column includes stock keeping units (SKUs) corresponding to products.

In Example 5, the subject natter of Examples 1-4 includes, wherein the specified product name column includes multiple product variants corresponding to the portion of the URL, and wherein the product is a first product of the multiple product variants that is identified when comparing the portion of the URL.

In Example 6, the subject matter of Examples 1-5 includes, wherein the portion of the URL and the specified product name column are determined based on the website.

In Example 7, the subject matter of Examples 1-6 includes, providing an insight related to the user interaction for the product at the website.

In Example 8, the subject matter of Examples 1-7 includes, displaying the indication of the product.

Example 9 is a computing apparatus, the computing apparatus comprising: a processor; and a memory storing instructions that, when executed by the processor, configure the apparatus to: receive a uniform resource locator (URL) based on a user interaction with a website, the user interaction triggering an event on the website; determine a portion of the URL; compare, using a regular expression, the portion of the URL to entries in a specified product name column of the database; identify a product in the specified product name column corresponding to the portion of the URL based on comparing the portion of the URL; and output an indication of the product.

In Example 10, the subject matter of Example 9 includes, wherein the user interaction includes a user selecting an indication to purchase the product on the website.

In Example 11, the subject matter of Examples 9-10 includes, wherein the portion of the URL corresponds to a product identifier.

In Example 12, the subject matter of Examples 9-11 includes, wherein the specified product name column includes stock keeping units (SKUs) corresponding to products.

In Example 13, the subject matter of Examples 9-12 includes, wherein the specified product name column includes multiple product variants corresponding to the portion of the URL, and wherein the product is a first product of the multiple product variants that is identified when comparing the portion of the URL.

In Example 14, the subject matter of Examples 9-13 includes, wherein the portion of the URL and the specified product name column are determined based on the website.

In Example 15, the subject matter of Examples 9-14 includes, wherein the computing apparatus further comprises a display device to present the indication of the product on a user interface.

Example 16 is at least one non-transitory machine-readable medium including instructions, which when executed by processing circuitry, cause the processing circuitry to perform operations to: receive a uniform resource locator (URL) based on a user interaction with a website, the user interaction triggering an event on the website; determine a portion of the URL; compare, using a regular expression, the portion of the URL to entries in a specified product name column of the database; identify a product in the specified product name column corresponding to the portion of the URL based on comparing the portion of the URL; and output an indication of the product.

In Example 17, the subject matter of Examples 14-16 includes, wherein the user interaction includes a user selecting an indication to purchase the product on the website.

In Example 18, the subject matter of Examples 14-17 includes, wherein the portion of the URL corresponds to a product identifier.

In Example 19, the subject matter of Examples 14-18 includes, wherein the specified product name column includes stock keeping units (SKUs) corresponding to products.

In Example 20, the subject matter of Examples 14-19 includes, wherein the instructions further cause the processing circuitry to perform operations to provide an insight related to the user interaction for the product at the website.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:
   receiving a uniform resource locator (URL) based on a user interaction with a website, the user interaction triggering an event on the website;
   comparing the URL to entries in a specified product name column of a database;
   in response to the URL comparison providing no result for the URL in the database, determining, using a processor, a portion of the URL;
   comparing, using a regular expression, the portion of the URL to the entries in the specified product name column of the database;
   identifying a product in the specified product name column corresponding to the portion of the URL based on comparing the portion of the URL; and
   outputting an indication of the product.

2. The method of claim 1, wherein the user interaction includes a user selection to purchase the product on the website.

3. The method of claim 1, wherein the portion of the URL corresponds to a product identifier.

4. The method of claim 1, wherein the specified product name column includes stock keeping units (SKUs) corresponding to products.

5. The method of claim 1, wherein the specified product name column includes multiple product variants corresponding to the portion of the URL, and wherein the product is a first product of the multiple product variants that is identified when comparing the portion of the URL.

6. The method of claim 1, wherein the portion of the URL and the specified product name column are determined based on the website.

7. The method of claim 1, further comprising providing an insight related to the user interaction for the product at the website.

8. The method of claim 1, further comprising displaying the indication of the product.

9. The method of claim 1, wherein comparing the URL to the entries in the specified product name column of the database includes using a second regular expression different from the regular expression.

10. The method of claim 1, further comprising, in response to the portion of the URL comparison providing no result for the portion of the URL in the database, comparing the portion of the URL to the entries in the specified product name column of the database using a second regular expression.

11. The method of claim 1, further comprising, in response to the portion of the URL comparison providing no result for the portion of the URL in the database, comparing the portion of the URL to second entries in a second specified column of the database using the regular expression.

12. The method of claim 1, wherein determining, using the processor, the portion of the URL includes using a second regular expression to extract the portion of the URL from the URL.

13. A computing apparatus, the computing apparatus comprising:
    a processor; and
    a memory storing instructions that, when executed by the processor, configure the apparatus to:
    receive a uniform resource locator (URL) based on a user interaction with a web site, the user interaction triggering an event on the website;
    compare the URL to entries in a specified product name column of a database;
    in response to the URL comparison providing no result for the URL in the database, determine a portion of the URL;
    compare, using a regular expression, the portion of the URL to the entries in the specified product name column of the database;
    identify a product in the specified product name column corresponding to the portion of the URL based on comparing the portion of the URL; and
    output an indication of the product.

14. The computing apparatus of claim 13, wherein the user interaction includes a user selection to purchase the product on the website.

15. The computing apparatus of claim 13, wherein the portion of the URL corresponds to a product identifier.

16. The computing apparatus of claim 13, wherein the specified product name column includes stock keeping units (SKUs) corresponding to products.

17. The computing apparatus of claim 13, wherein the specified product name column includes multiple product variants corresponding to the portion of the URL, and wherein the product is a first product of the multiple product variants that is identified when comparing the portion of the URL.

18. The computing apparatus of claim 13, wherein the portion of the URL and the specified product name column are determined based on the website.

19. The computing apparatus of claim 13, wherein the computing apparatus further comprises a display device to present the indication of the product on a user interface.

20. At least one non-transitory machine-readable medium including instructions, which when executed by processing circuitry, cause the processing circuitry to perform operations to:
    receive a uniform resource locator (URL) based on a user interaction with a web site, the user interaction triggering an event on the website;

compare the URL to entries in a specified product name column of a database;

in response to the URL comparison providing no result for the URL in the database, determine a portion of the URL;

compare, using a regular expression, the portion of the URL to the entries in the specified product name column of the database;

identify a product in the specified product name column corresponding to the portion of the URL based on comparing the portion of the URL; and output an indication of the product.

21. The at least one machine-readable medium of claim 20, wherein the user interaction includes a user selection to purchase the product on the website.

22. The at least one machine-readable medium of claim 20, wherein the portion of the URL corresponds to a product identifier.

23. The at least one machine-readable medium of claim 20, wherein the specified product name column includes stock keeping units (SKUs) corresponding to products.

24. The at least one machine-readable medium of claim 20, wherein the instructions further cause the processing circuitry to perform operations to provide an insight related to the user interaction for the product at the website.

\* \* \* \* \*